(12) United States Patent
Plancarte et al.

(10) Patent No.: US 8,881,154 B2
(45) Date of Patent: Nov. 4, 2014

(54) COMPLEX DEPENDENCY GRAPH WITH BOTTOM-UP CONSTRAINT MATCHING FOR BATCH PROCESSING

(75) Inventors: Gustavo A. Plancarte, Bothell, WA (US); Tao Wang, Issaquah, WA (US); Vijay B. Kurup, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1592 days.

(21) Appl. No.: 12/340,742

(22) Filed: Dec. 22, 2008

(65) Prior Publication Data
US 2010/0162248 A1    Jun. 24, 2010

(51) Int. Cl.
*G06F 9/455* (2006.01)
*G06F 9/46* (2006.01)
*G06F 9/48* (2006.01)

(52) U.S. Cl.
CPC ............................ *G06F 9/4843* (2013.01)
USPC .......................................................... 718/101

(58) Field of Classification Search
None
See application file for complete search history.

(56) References Cited

U.S. PATENT DOCUMENTS

| | | | |
|---|---|---|---|
| 6,920,461 B2* | 7/2005 | Hejlsberg et al. ................. | 1/1 |
| 7,289,964 B1 | 10/2007 | Bowman-Amuah | |
| 2003/0149717 A1* | 8/2003 | Heinzman ..................... | 709/101 |
| 2005/0021348 A1 | 1/2005 | Chan et al. | |
| 2006/0074731 A1 | 4/2006 | Green et al. | |
| 2006/0107265 A1 | 5/2006 | Schulz et al. | |
| 2008/0034367 A1* | 2/2008 | Patrick et al. ................. | 718/101 |

OTHER PUBLICATIONS

Chaffin, et al., "What's New in SQL Server 2005 Integration Services", Retrieved at <<http://download.microsoft.com/download/a/4/7/a47b7b0e-976d-4f49-b15d-f02ade638ebe/WhatsNewinSSIS.doc>>, Apr. 2005.
Kuikka, Seppo, "A Batch Process Management Framework", Retrieved at <<http://citeseerx.ist.psu.edu/viewdoc/summary?doi=10.1.1.18.1456>>, VTT Publications 398, ESPOO 1999.
"Advanced Ax Batch", Retrieved at <<http://www.larsmikkelsen.com/products?gclid=CPW1nlmsg5YCFQ6T1QodXx6-FQ>>, Oct. 1, 2008, pp. 1-2.
Roy, et al., "Efficient and Extensible Algorithms for Multi Query Optimization", Retrieved at <<http://arxiv.org/PS_cache/cs/pdf/9910/9910021v1.pdf>>, Oct. 25, 1999, pp. 1-25.
Liu, et al., "A Study on Batch Processing Model in Workflow", Retrieved at <<http://ieeexplore.ieee.org/iel5/11136/35651/01691434.pdf>>, Proceedings of the First International Conference on Semantics, Knowledge, and Grid (SKG 2005), IEEE 2006.

* cited by examiner

*Primary Examiner* — Corey S Faherty
(74) *Attorney, Agent, or Firm* — Damon Rieth; Brian Haslam; Micky Minhas

(57) ABSTRACT

Architecture that includes a batch framework engine incorporated into the server and that supports a rich set of dependencies between tasks in a single batch job. A bottom-up approach is employed where analysis is performed if a task can run based on the parent tasks. The framework runs batch jobs without the need of a client, and provides the ability to create dependencies between tasks, which allow the execution of tasks in parallel or in sequence. Using an AND/OR relationship engine, a task can require that all parent tasks (logical AND) meet requirements to run, or that only one parent (logical OR) is required to meet its requirements in order to run. Clean-up or non-important tasks can have the a flag set where even if such tasks fail when executing, the batch job will ignore these tasks when defining the final status of the job.

20 Claims, 7 Drawing Sheets

COMPLEX DEPENDENCY GRAPH WITH BOTTOM-UP CONSTRAINT MATCHING FOR BATCH PROCESSING

BACKGROUND

A batch framework can typically support a single task that represents a job. The framework can also execute serial tasks with the assistance of a batch journal; however, there may not be other dependency support. Additionally, tasks execution can require connecting a client and manually launching a batch engine. Other batch engines can employ a workflow style where a task that finishes executing includes the logic about what to do next.

For example, the following limitations can exist in current batch processing frameworks. The framework requires a client for processing batch jobs, and the batch cannot simply be submitted with the assumption that the job will be executed, as the job may not run if a client is not open. Moreover, the framework may not support parallelism. There can be various scenarios where a batch job that processes transactions, for example, could be broken into separate sub-jobs and executed against different batch server instances to increase throughput and reduce overall execution time. The batch framework may not allow the creation of a dependency tree for the different tasks that comprise the batch job.

Additionally, the batch framework may not allow outputs to be generated on the server, which means that reports cannot be run in a batch mode, since the output of the report cannot be stored or printed on the server. Another limitation can be that there is no administrative console to view batch job execution.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a batch framework engine incorporated into the server and that supports a rich set of dependencies between tasks in a single batch job. The architecture employs a bottom-up approach where analysis is performed if a task can run based on the parent tasks. This allows the creation of rich batch jobs with multiple root tasks and multiple parent and child relationships.

The batch framework provides a "headless" runtime, which means the ability to run batch jobs without the need to have a client connected. The new batch also provides the ability to create dependencies between tasks, which allow the execution of tasks in parallel or in sequence depending on the business need.

Bottom-up constraint matching is provided where a task is ready to run if the parent(s) have finished with the desired status. Using a set-based relationship engine (e.g., logical AND, OR, etc.), a task can require that all parent tasks (logical AND) meet their requirements to run, or that only one parent (logical OR) is required to meet its constraints in order to run.

Clean-up or non-important tasks can have the a flag set where even if such tasks fail when executing, the batch job will ignore these tasks when defining the final status of the job.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
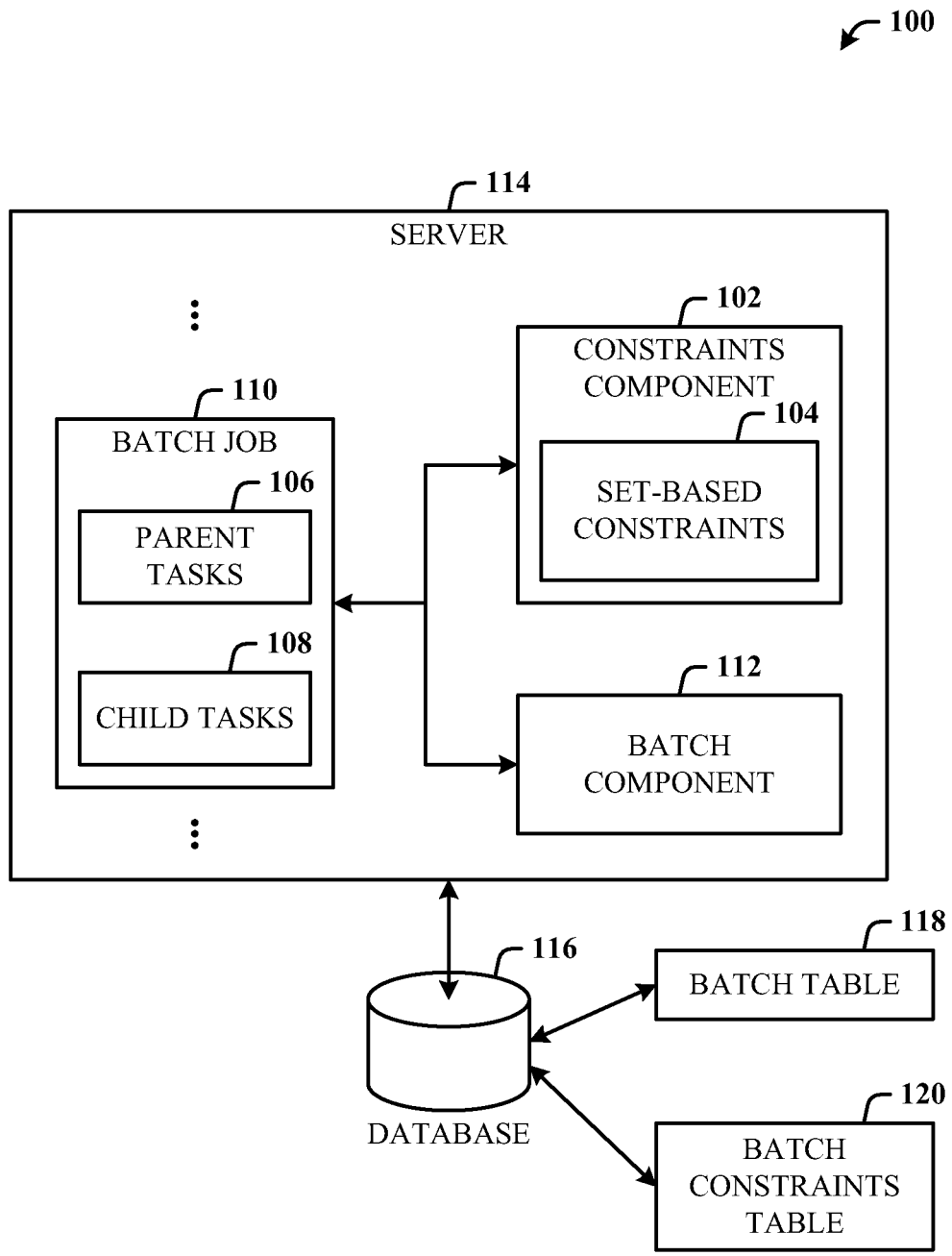
FIG. 1 illustrates a computer-implemented batch processing system in accordance with the disclosed architecture.

The disclosed architecture includes a batch framework engine incorporated into a server and that supports a rich set of dependencies between tasks in a single batch job. The architecture employs a bottom-up approach where analysis is performed if a task can run based on the parent tasks. This allows the creation of rich batch jobs with multiple root tasks and multiple parent and child relationships. Moreover, the batch framework provides a "headless" runtime, which provides the ability to run batch jobs without the need to have a client connected. The new batch also provides the ability to create dependencies between tasks that allow the execution of tasks in parallel or in sequence depending on the business need.

The headless architecture facilitates server bound batches without need for a client. Benefits can include the following: client-side batches are supported, batch jobs can run under job submitter account, batch servers can be defined, all batch servers can be managed from a single location, and the capacity for each server can be configured. Additionally, a batch server can be defined to operate for a specific duration, specific batch groups run on a server, and automatically load balance batches between the defined batch servers.

With respect to administration, the architecture includes enhanced administration forms for configuring and managing jobs and job tasks, viewing job history for all jobs or a specific job, viewing status/progress for a job or its tasks, viewing all messages associated with a job or task, identifying a server that is executing a task, choosing a level of logging (e.g., errors, warnings, all), and killing any job, if desired. Additionally, user jobs can be managed and viewed via a user form, and users can create single step jobs that do not have complex dependencies.

With respect to the framework programmability, jobs can be created and tasks added to the jobs, complex dependencies can be added between tasks, tasks can be in serial or parallel depending on business logic, and multiple threads can be run in parallel across batch servers. Additionally, tasks can be spawned at runtime depending on the workload, the batch server automatically runs multiple threads based on capacity, a task can be automatically retried in the case of system failures, and dependency trees can be created by the developer (e.g., the X++ programming language) or batch operator through the user interface (UI).

As utilized herein, a batch job is a logical group of tasks that includes settings such as recurrence and can be saved into a batch job table.

A batch task is a unit of execution that includes all information needed to run an instance of a batch class. The batch task can also have dependencies with other batch tasks within the same batch job. The same task can be in the same batch job more than once and have different dependencies. The batch task is saved into the batch table.

A batch server is a server that can obtain and execute batch tasks and process dependencies.

A batch constraint is a dependency between two tasks (e.g., a parent and a child). A constraint can call for some status from the parent task before the child task can start. Each constraint relates the associated tasks and specifies an expected status for the parent task. The constraints can be set-based of type "AND" or "OR". An "AND" constraint calls for all parent constraints to match before the child task can start executing. An "OR" constraint calls for only one parent constraint to be a match to start the child task.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented batch processing system 100 in accordance with the disclosed architecture. The system 100 can include a constraints component 102 for defining set-based constraints 104 between parent tasks 106 and child tasks 108 of a batch job 110, and a batch component 112 for processing the batch job 110 based on the child tasks 108 and the set-based constraints 104.

The constraints can be such that a child task executes when all the parent tasks 106 match an expected status as defined by a set-based constraint, or when one (e.g., only) of the parent tasks 106 matches an expected status as defined by a set-based constraint.

The constraints component 102 and batch component 112 operate in a "headless" manner on a server 114 such that no client intervention is required. Moreover, the set-based constraints can be applied directly to a database 116, which includes tasks waiting to be picked up and executed based on a batch table status. The database 116 can include a batch table 118 that stores batch job task status information such as for a parent (or root) task status information such as "Ready" (pick up for execution), "Waiting" (in execution, but not yet processed), "Executing" (currently being executed), and so on. A batch constraints table 120 can also be stored in the database 116 to define and track dependencies between batch tasks.

The child tasks can include a task flagged to be ignored when the batch job 110 defines a final status. The batch job 110 is finished when no job task is executing or ready after processing the constraints of the job. The batch component 112 processes a child task when associated parent tasks have met dependency constraints.

Put another way, the batch processing system 100 can include the server-based constraints component 102 for defining set-based constraints (e.g., AND, OR) between the parent tasks 106 and the child tasks 108 of the batch job 110, and the server-based batch component 112 for processing the batch job 110 based on the child tasks 108 and the set-based constraints 104. The batch job 110 is finished when no job task is designated as executing or ready after processing the constraints of the job. The child task executes when all the parent tasks match an expected status or when only one of the parent tasks matches an expected status.

The constraints component 102 and batch component 112 operate on the server 114 without client intervention and the set-based constraints 104 are applied directly to the database 116. The child tasks 108 include a task flagged to be ignored when the batch job defines a final status. The batch component 112 processes a child task when associated parent tasks have met dependency constraints.

Figure 2:
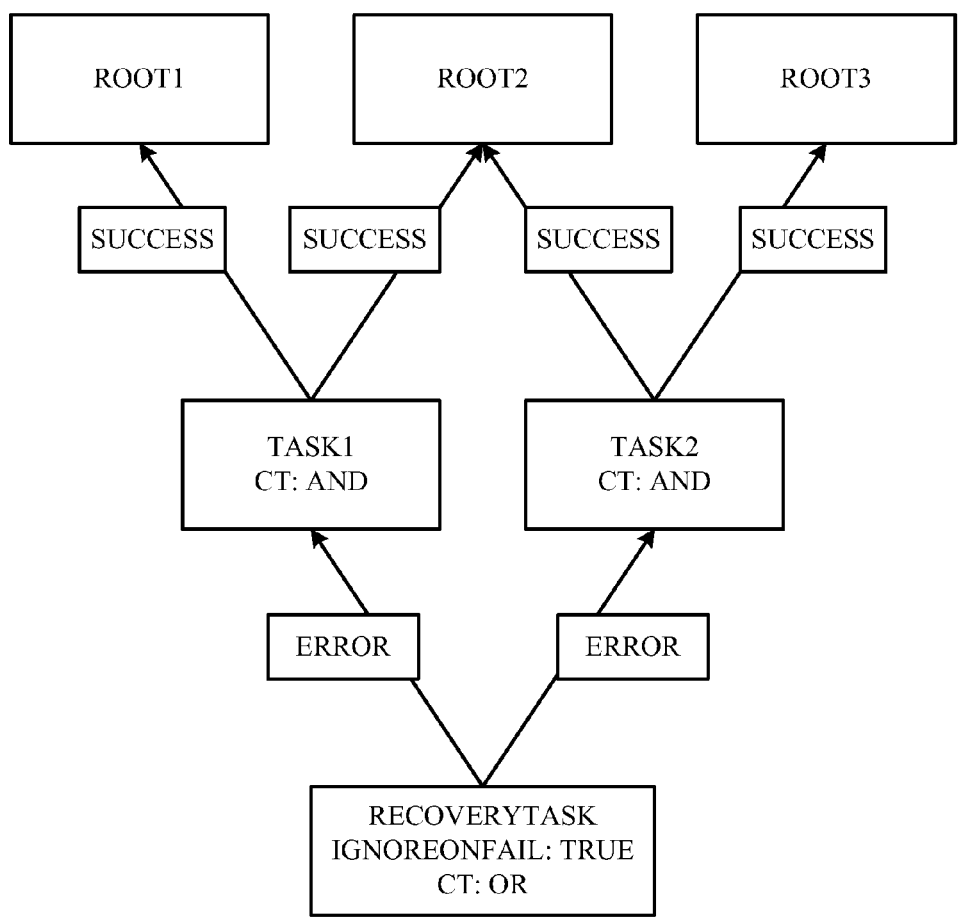
FIG. 2 illustrates a batch job that employs task dependencies and bottom-up constraint matching.

FIG. 2 illustrates a batch job 200 that employs task dependencies and bottom-up constraint matching. The batch job 200 includes five tasks: root or parent tasks—Root1, Root2 and Root3, and three child tasks—Task1, Task2, and RecoveryTask. The root tasks will immediately be designated "Ready" to run when the job 200 starts execution. Child Task1 has an AND constraint (CT) type and expects parent tasks Root1 and Root2 to finish successfully before Task1 can run. Child Task2 depends on Root2 and Root3 also to finish successfully. Finally, the RecoveryTask, has an OR constraint type, meaning that if Task1 or Task2 fails (Error), the RecoveryTask will run; otherwise, the batch job 200 would finish without necessarily having to run all tasks. The batch job final status will not be affected by the RecoveryTask, because the RecoveryTask has an IgnoreOnFail flag set. If all the other tasks succeed, the job 200 will also succeed.

The batch framework is a high performance, highly scalable system. To achieve this, the framework processes dependencies efficiently by leveraging set-based operations directly on the database. The bottom-up constraint matching facilitates the readiness in running of a task if the parent tasks to the task have finished with the called-for status. The set-based (e.g., AND, OR) relationship engine operates to require that all parent tasks meet their requirements, or that only one parent is required to meet constraints in order to run. Clean-up or non-important tasks can have the IgnoreOnFail flag set, even if failed when executing. The batch job ignores these so designated tasks when defining the final status of the job.

Initially, an executing batch job has all its tasks set to a status "Waiting" in a batch table. The batch framework changes a task status with the following logic. Change all root tasks (a task with no dependencies) of executing jobs to "Ready". Change the task to "Ready" in the batch table where the task is currently designated "Waiting" and has a constraint type is "AND". This constraint requires that all parent tasks match an expected status. Additionally, there is no mismatch between the task status and the expected status in a batch constraints table.

Change the task to "Ready" in the batch table where the task is currently "Waiting" and the task constraint type is OR (at least one parent is required to match the expected status), and there is at least one match between a parent status and the expected status in the batch constraints table.

The batch job is considered as finished when none of the job tasks is designated as "Executing" or "Ready" after processing the task dependencies.

Note that the job could finish even when some tasks did not run. The job status will change to "Error" if any task failed and the IgnoreOnFail flag was not set in such task; otherwise, the job status will be Ended for success.

Database schema entities in the batch constraints table that represent dependencies between batch tasks can include a BatchId: type RecId, ExpectedStatus: type int, and DependsOnBatchId: type RecId. Database schema entities in the batch table that represent a task can include a ContraintType: type enum (int) and IgnoreOnFail: type Boolean.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
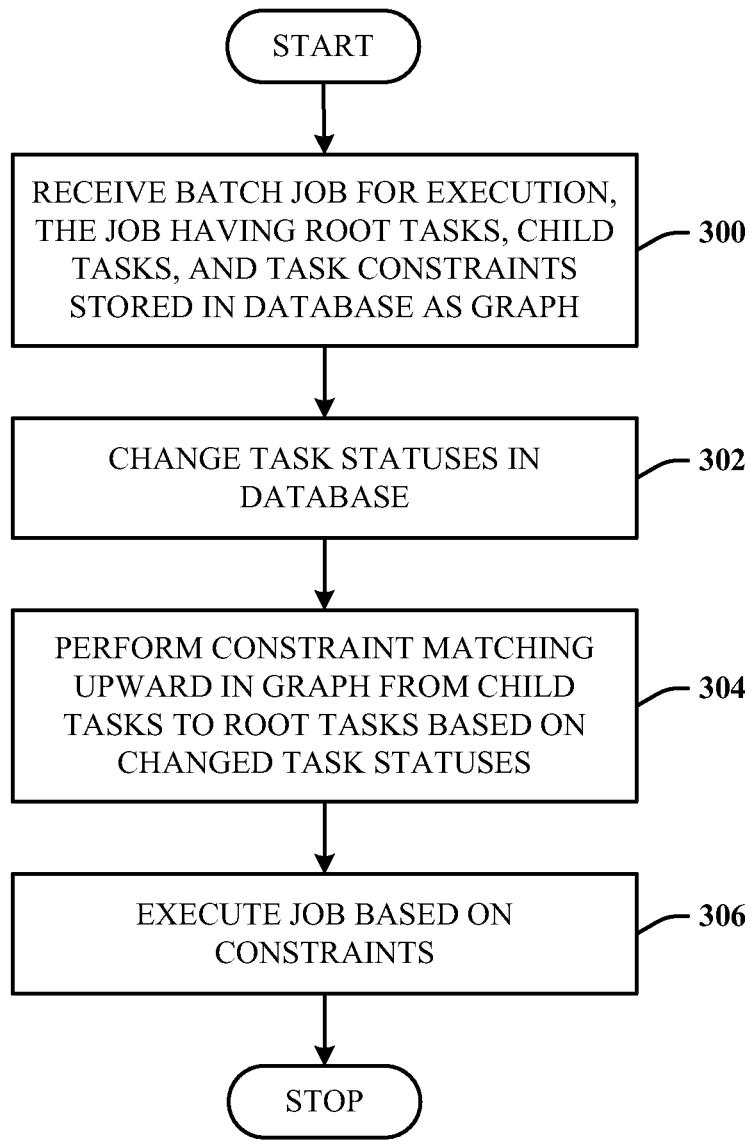
FIG. 3 illustrates a batch processing method.

FIG. 3 illustrates a batch processing method. At 300, a batch job is received for execution. The batch job can be represented as a graph having root tasks, child tasks, and task constraints, all of which is stored in a database. At 302, task statuses are changed in the database. At 304, constraint matching is performed upward in the graph from the child tasks to the root tasks based on the changed task statuses. At 306, the job is executed based on the constraints.

Figure 4:
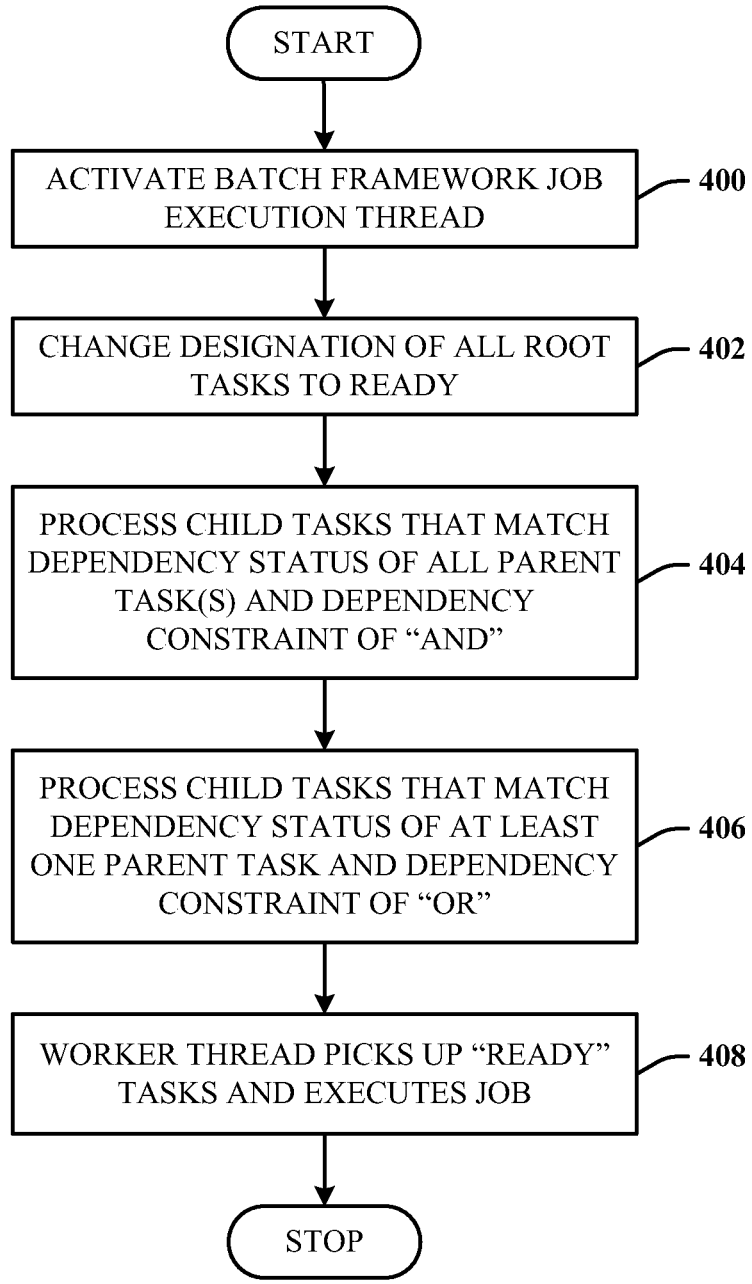
FIG. 4 illustrates an alternative batch processing method.

FIG. 4 illustrates an alternative batch processing method. At 400, a batch framework job execution thread is activated. At 402, the designation of all root tasks is changed to Ready. At 404, child tasks that match dependency status of all parent tasks and having a dependency constraint of AND, are processed. At 406, child tasks that match dependency status of at least one parent task and having a dependency constraint of OR, are processed. At 408, a worker thread picks up the Ready tasks and executes the job.

Figure 5:
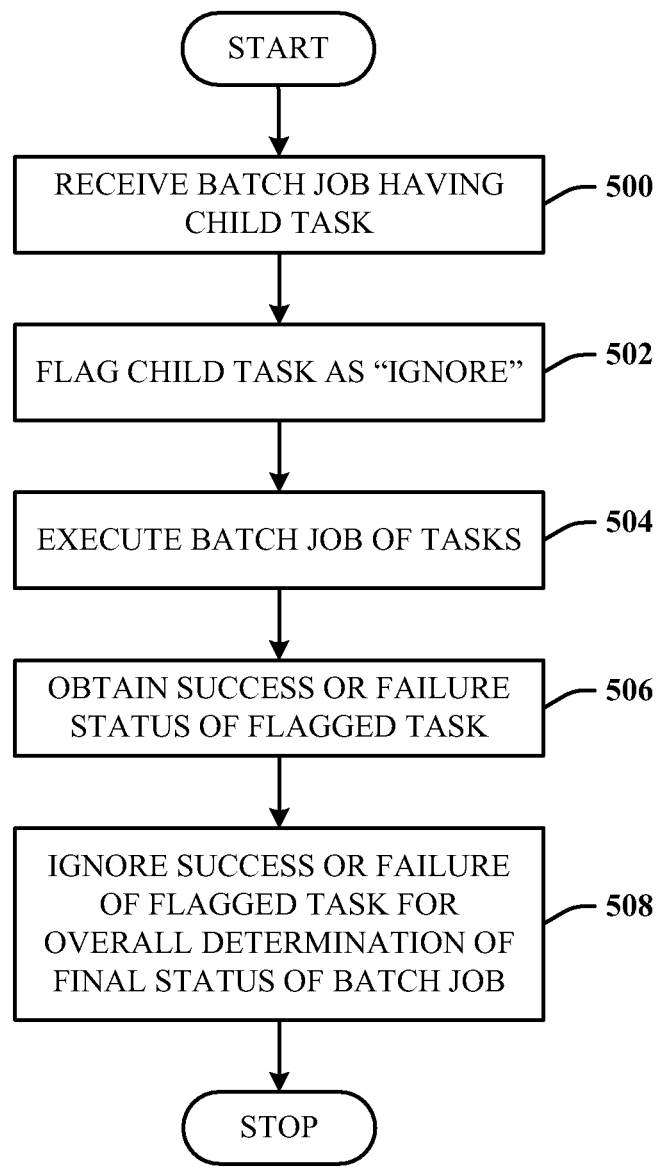
FIG. 5 illustrates a method of determining batch status based on ignored tasks.

FIG. 5 illustrates a method of determining batch status based on ignored tasks. At 500, a batch job is received, the job having a child task. At 502, the child task is flagged to be ignored. At 504, the batch job of parent and child tasks is executed. At 506, success or failure status of the flagged tasks is obtained. At 508, the success or failure status of the flagged task is ignored for the overall determination of the final status of the batch job.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 6:
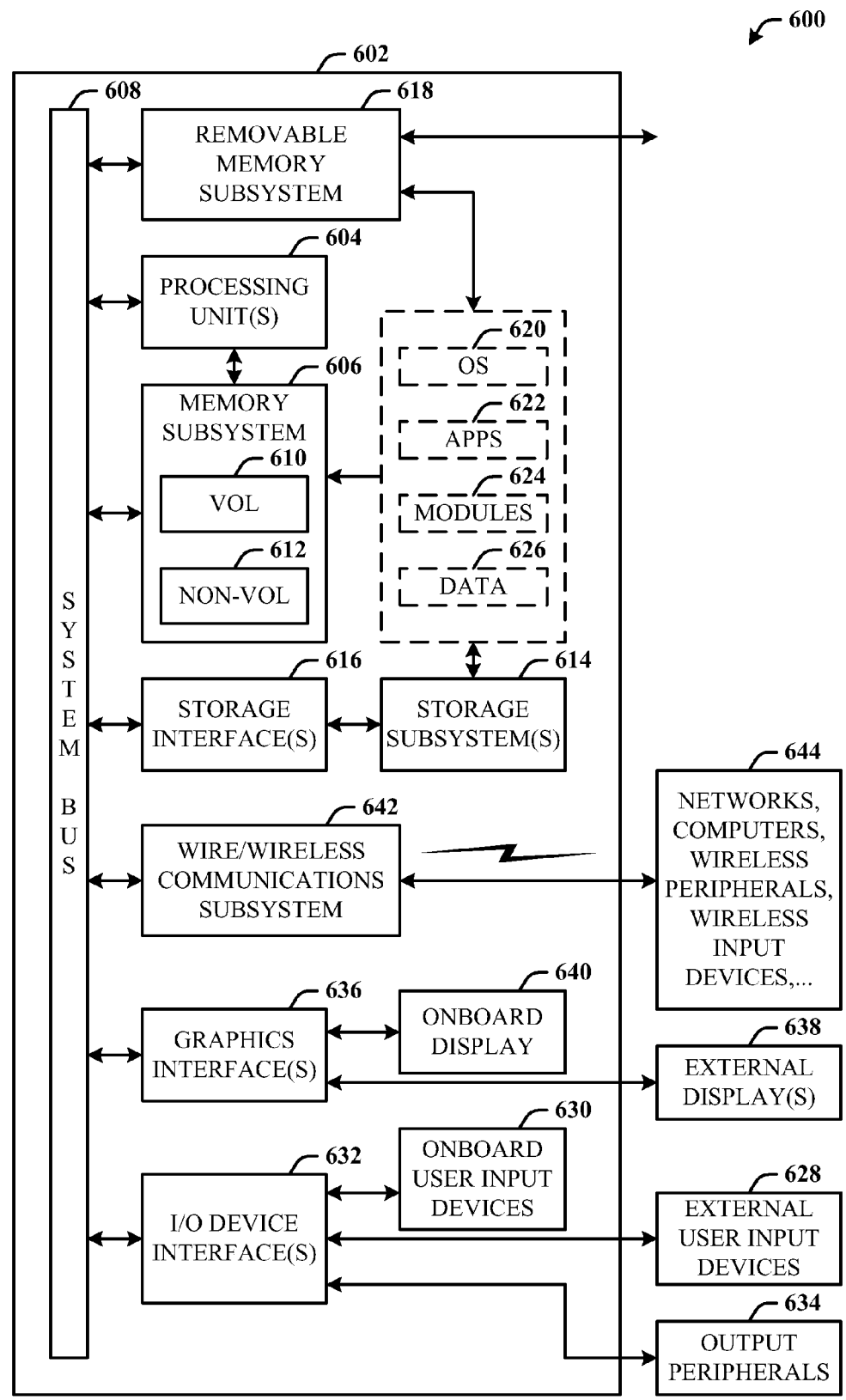
FIG. 6 illustrates a block diagram of a computing system operable as a server to execute headless bottom-up batch job execution in accordance with the disclosed architecture.

Referring now to FIG. 6, there is illustrated a block diagram of a computing system 600 operable as a server to execute headless bottom-up batch job execution in accordance with the disclosed architecture. In order to provide additional context for various aspects thereof, FIG. 6 and the following discussion are intended to provide a brief, general description of the suitable computing system 600 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 600 for implementing various aspects includes the computer 602 having processing unit(s) 604, a system memory 606, and a system bus 608. The processing unit(s) 604 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 606 can include volatile (VOL) memory 610 (e.g., random access memory (RAM)) and non-volatile memory (NON-VOL) 612 (e.g., ROM, EPROM, EEPROM, etc.). A basic input/output system (BIOS) can be stored in the non-volatile memory 612, and includes the basic routines that facilitate the communication of data and signals between components within the computer 602, such as during startup. The volatile memory 610 can also include a high-speed RAM such as static RAM for caching data.

The system bus 608 provides an interface for system components including, but not limited to, the memory subsystem 606 to the processing unit(s) 604. The system bus 608 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 602 further includes storage subsystem(s) 614 and storage interface(s) 616 for interfacing the storage subsystem(s) 614 to the system bus 608 and other desired computer components. The storage subsystem(s) 614 can include one or more of a hard disk drive (HDD), a magnetic floppy disk drive (FDD), and/or optical disk storage drive (e.g., a CD-ROM drive DVD drive), for example. The storage interface(s) 616 can include interface technologies such as EIDE, ATA, SATA, and IEEE 1394, for example.

One or more programs and data can be stored in the memory subsystem 606, a removable memory subsystem 618 (e.g., flash drive form factor technology), and/or the storage subsystem(s) 614, including an operating system 620, one or more application programs 622, other program modules 624, and program data 626. The one or more application programs 622, other program modules 624, and program data 626 for the computer 602 as a server can include the system 100 of FIG. 1, the example batch job 200 of FIG. 2, and the methods described in FIGS. 3-5, for example.

Generally, programs include routines, methods, data structures, other software components, etc., that perform particular tasks or implement particular abstract data types. All or portions of the operating system 620, applications 622, modules 624, and/or data 626 can also be cached in memory such as the volatile memory 610, for example. It is to be appreciated that the disclosed architecture can be implemented with various commercially available operating systems or combinations of operating systems (e.g., as virtual machines).

The storage subsystem(s) 614 and memory subsystems (606 and 618) serve as computer readable media for volatile and non-volatile storage of data, data structures, computer-executable instructions, and so forth. Computer readable media can be any available media that can be accessed by the computer 602 and includes volatile and non-volatile media, removable and non-removable media. For the computer 602, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 602, programs, and data using external user input devices 628 such as a keyboard and a mouse. Other external user input devices 628 can include a microphone, an IR (infrared) remote control, a joystick, a game pad, camera recognition systems, a stylus pen, touch screen, gesture systems (e.g., eye movement, head movement, etc.), and/or the like. The user can interact with the computer 602, programs, and data using onboard user input devices 630 such a touchpad, microphone, keyboard, etc., where the computer 602 is a portable computer, for example. These and other input devices are connected to the processing unit(s) 604 through input/output (I/O) device interface(s) 632 via the system bus 608, but can be connected by other interfaces such as a parallel port, IEEE 1394 serial port, a game port, a USB port, an IR interface, etc. The I/O device interface(s) 632 also facilitate the use of output peripherals 634 such as printers, audio devices, camera devices, and so on, such as a sound card and/or onboard audio processing capability.

One or more graphics interface(s) 636 (also commonly referred to as a graphics processing unit (GPU)) provide graphics and video signals between the computer 602 and external display(s) 638 (e.g., LCD, plasma) and/or onboard displays 640 (e.g., for portable computer). The graphics interface(s) 636 can also be manufactured as part of the computer system board.

The computer 602 can operate in a networked environment (e.g., IP) using logical connections via a wire/wireless communications subsystem 642 to one or more networks and/or other computers. The other computers can include workstations, servers, routers, personal computers, microprocessor-based entertainment appliance, a peer device or other common network node, and typically include many or all of the elements described relative to the computer 602. The logical connections can include wire/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 602 connects to the network via a wire/wireless communication subsystem 642 (e.g., a network interface adapter, onboard transceiver subsystem, etc.) to communicate with wire/wireless networks, wire/wireless printers, wire/wireless input devices 644, and so on. The computer 602 can include a modem or has other means for establishing communications over the network. In a networked environment, programs and data relative to the computer 602 can be stored in the remote memory/storage device, as is associated with a distributed system. It will be appreciated that the network connections shown are exemplary and other means of establishing a communications link between the computers can be used.

The computer 602 is operable to communicate with wire/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 7:
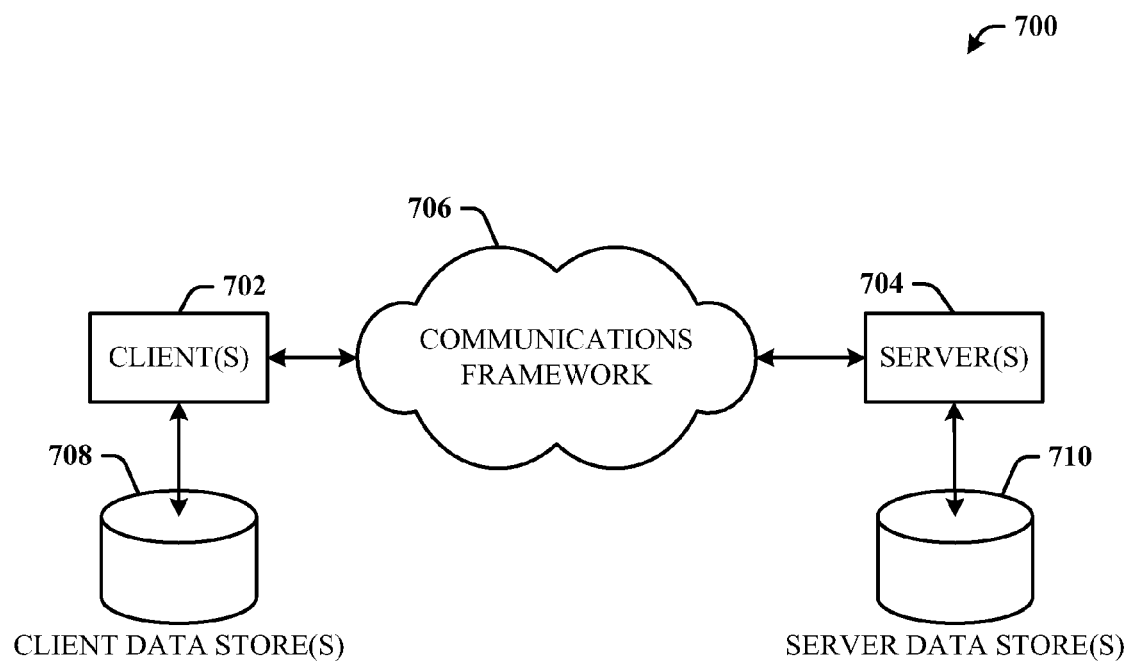
FIG. 7 illustrates a schematic block diagram of a computing environment that supports headless bottom-up batch job execution.

Referring now to FIG. 7, there is illustrated a schematic block diagram of a computing environment 700 that supports headless bottom-up batch job execution. The environment 700 includes one or more client(s) 702. The client(s) 702 can be hardware and/or software (e.g., threads, processes, computing devices). The client(s) 702 can house cookie(s) and/or associated contextual information, for example.

The environment 700 also includes one or more server(s) 704. The server(s) 704 can also be hardware and/or software (e.g., threads, processes, computing devices). The servers 704 can house threads to perform transformations by employing the architecture, for example. One possible communication between a client 702 and a server 704 can be in the form of a data packet adapted to be transmitted between two or more computer processes. The data packet may include a cookie and/or associated contextual information, for example. The environment 700 includes a communication framework 706 (e.g., a global communication network such as the Internet) that can be employed to facilitate communications between the client(s) 702 and the server(s) 704.

Communications can be facilitated via a wire (including optical fiber) and/or wireless technology. The client(s) 702 are operatively connected to one or more client data store(s) 708 that can be employed to store information local to the client(s) 702 (e.g., cookie(s) and/or associated contextual information). Similarly, the server(s) 704 are operatively connected to one or more server data store(s) 710 that can be employed to store information local to the servers 704.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented batch processing system, comprising:
   a processing unit;
   a constraints component executing on the processing unit for defining set-based constraints between parent tasks and child tasks of a batch job, wherein a set-based constraint defines a dependency between a parent task and a child task and specifies a parent task status needed before a child task of the parent task can execute; and
   a batch component executing on the processing unit for processing the batch job based on the child tasks and the set-based constraints by updating statuses for tasks in the batch job, performing constraint matching from the child tasks to the parent tasks based on the updated task statuses, and executing the tasks in the batch lob according to the constraints.

2. The system of claim 1, wherein the child task executes when all the parent tasks match an expected status as defined by a set-based constraint.

3. The system of claim 1, wherein the child task executes when one of the parent tasks matches an expected status as defined by a set-based constraint.

4. The system of claim 1, wherein the constraints component and batch component operate on a server without client intervention.

5. The system of claim 1, wherein the set-based constraints are applied directly on a database.

6. The system of claim 1, wherein the child tasks include a task flagged to be ignored when the batch job defines a final status.

7. The system of claim 1, wherein the batch job is finished when no job task is executing or ready after processing the constraints of the job.

8. The system of claim 1, wherein the batch component processes a child task when associated parent tasks have met dependency constraints.

9. A computer-implemented batch processing system, comprising:
   a processing unit;
   a constraints component of a server executing on the processing unit for defining set-based constraints between parent tasks and child tasks of a batch job, wherein a set-based constraint defines a dependency between a parent task and a child task and specifies a parent task status needed before a child task of the parent task can execute; and
   a batch component of the server executing on the processing unit for processing the batch job based on the child tasks and the set-based constraints by updating statuses for tasks in the batch job, performing constraint matching from the child tasks to the parent tasks based on the updated task statuses, and executing the tasks in the batch job according to the constraints, the batch job is finished when no job task is designated as executing or ready after processing the constraints of the job.

10. The system of claim 9, wherein the child task executes when all the parent tasks match an expected status or when only one of the parent tasks matches an expected status.

11. The system of claim 9, wherein the constraints component and batch component operate on the server without client, intervention and the set-based constraints are applied directly on a database.

12. The system of claim 9, wherein the child tasks include a task flagged to be ignored when the batch job defines a final status.

13. The system of claim 9, wherein the batch component processes a child task when associated parent tasks have met dependency constraints.

14. A computer-implemented batch processing method, comprising:
   receiving a batch job for execution, the batch job represented as a graph having root tasks, child tasks, and task constraints stored in a database, wherein a task constraint defines a dependency between a parent task and a child task and specifies a parent task status needed before a child task of the parent task can execute;
   changing task statuses in the database;
   performing constraint matching upward in the graph from the child tasks to the root tasks based on the changed task statuses; and
   executing the job based on the constraints.

15. The method of claim 14, wherein the task statuses for the root tasks are changed to designate ready for processing in a hatch table of the database.

16. The method of claim 14, further comprising processing child tasks that match a dependency status of all parent tasks and have a constraint of logical AND.

17. The method of claim 16, further comprising processing child tasks that match a dependency status of at least one parent task and have a constraint of logical OR.

18. The method of claim 14, further comprising ignoring success or failure of a task flagged to be ignored during execution of the batch job when determining overall status of the batch job.

19. The method of claim 14, further comprising maintaining a constraints table on the database that represents dependencies between batch tasks.

20. The method of claim 14, wherein a task is independent in the batch job or has multiple dependencies defined in the batch job.

* * * * *